United States Patent [19]

Kim et al.

[11] Patent Number: 5,767,030

[45] Date of Patent: *Jun. 16, 1998

[54] HIGH FREQUENCY DIELECTRIC CERAMIC COMPOSITION AND FABRICATION METHOD THEREOF

[75] Inventors: Hyo Tae Kim; Yoon Ho Kim, both of Seoul, Rep. of Korea

[73] Assignee: Korea Institute of Science and Technology, Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 708,597

[22] Filed: Sep. 5, 1996

[30] Foreign Application Priority Data

Sep. 5, 1995 [KR] Rep. of Korea .................. 28995/1995

[51] Int. Cl.$^6$ .................. C04B 35/462; C04B 35/465
[52] U.S. Cl. .................. 501/136; 501/137; 501/138
[58] Field of Search .................. 501/137, 138, 501/134, 135, 136

[56] References Cited

U.S. PATENT DOCUMENTS

| | | | |
|---|---|---|---|
| 4,610,968 | 9/1986 | Wada et al. | 501/137 |
| 4,665,041 | 5/1987 | Higuchi et al. | 501/134 |
| 4,670,409 | 6/1987 | Okawa et al. | 501/135 |
| 4,829,032 | 5/1989 | Fumio et al. | 501/137 |
| 4,845,062 | 7/1989 | Burn | 501/136 |
| 4,999,737 | 3/1991 | Kishi et al. | 361/321 |
| 5,006,954 | 4/1991 | Kishi et al. | 501/137 |
| 5,006,955 | 4/1991 | Kishi et al. | 361/321 |
| 5,077,247 | 12/1991 | Sato et al. | 501/137 |
| 5,290,740 | 3/1994 | Abe et al. | 501/139 |
| 5,378,663 | 1/1995 | Abe et al. | 501/32 |
| 5,635,433 | 6/1997 | Sengupta | 501/137 |
| 5,635,436 | 6/1997 | Fukuda et al. | 501/138 |
| 5,645,753 | 7/1997 | Fukuoka et al. | 252/62.9 PZ |
| 5,672,378 | 9/1997 | Maher et al. | 427/123 |

FOREIGN PATENT DOCUMENTS 2 166 431  5/1986  United Kingdom.

*Primary Examiner*—Mark L. Bell
*Assistant Examiner*—Louis M. Troilo
*Attorney, Agent, or Firm*—McDermott, Will & Emery

[57] ABSTRACT

An improved high frequency dielectric ceramic composition and a fabrication method thereof, which is sintered at a low temperature ranging from 900° to 1250° C. without using a sintering aid and which has a fine structure and excellent dielectric characteristics, which includes of $TiO_2 \cdot x(ZnO)$ where $0.04 \leq x \leq 1.0$.

3 Claims, No Drawings

HIGH FREQUENCY DIELECTRIC CERAMIC COMPOSITION AND FABRICATION METHOD THEREOF

BACKGROUND OF THE INVENTION

1. Field of the Invention

The present invention relates to a high frequency dielectric ceramic composition and a fabrication method thereof, and particularly to an improved high frequency dielectric ceramic composition which is composed of $TiO_2$ in the amount of 1 mol to ZnO in the amount of 0.04~1.00 mol.

2. Description of the Conventional Art

Recently, electronic components which are used for a mobile communication device such as a mobile telephone and the like and a receiver/transmitter for satellite communication are made more compact and light. Therefore, the frequency-adaptable parts are generally made in a laminated type or a combined type, with the parts being able to be surface-mounted. A ceramic dielectric material is used for components of an electronic circuit, for example, for a by-pass, coupling, filtering, or the like capacitor, for which, the ceramic dielectric capacitor, due to its temperature compensation characteristic, is particularly used for the fabrication of a coupling circuit, a band filter, a resonator, and the like.

Among important electrical characteristics for fabricating the high frequency devices, there are a high dielectric constant $\epsilon_r$ and a low dielectric loss "tan $\delta$", a high quality factor Q, a temperature coefficient of capacitance TCC, and/or of a resonant frequency $\tau_f$. In addition, a high insulation resistance, a high mechanical strength, a low thermal expansion coefficient, and the like are further desirable for fabricating high frequency devices.

The most important among characteristics for timing and tuning when practically using such the components is the stability of the quality factor, the electrical capacitance, or the resonant frequency. Moreover, for the resonant frequency of a tuning circuit, to be stably maintained, requires a proper measure or a compensation with respect to the circuit environment such as variations in temperature, moisture, voltage, or current.

The conventional high frequency dielectric compositions such as a barium titanate type ($BaTi_4O_9$, $Ba_2Ti_9O_{20}$, $BaTi_5O_{11}$), a modified magnesium titanate type (($Mg$, $Ca$)$TiO_3$), a ZST type (Zr, Sn)$TiO_4$, a barium perovskite ($Ba(Zn_{1/3}Nb_{2/3})O_3$, $Ba(Zn_{1/3}Ta_{2/3})O_3$, $Ba(Mg_{1/3}Nb_{2/3})O_3$, $Ba(Mg_{1/3}Ta_{2/3})O_3$, a $(Ca,Sr,Ba)ZrO_3$ type, a $(Ca, Sr)((Li, Nb)Ti)O_3$, and the like have a sintering temperature ranging from 1300°~1600° C. With these compositions, it is impossible to fabricate a sintered material having a desired mechanical strength and a dielectric characteristic without adding a sintering aid.

SUMMARY OF THE INVENTION

Accordingly, it is an object of the present invention to provide a high frequency dielectric ceramic composition and a fabrication method thereof, which overcomes the problems encountered in the conventional high frequency dielectric ceramic compositions.

It is another object of the present invention to provide an improved high frequency dielectric ceramic composition and a fabrication method thereof having a ternary composition type which is composed of a relatively inexpensive metallic oxide material.

It is another object of the present invention to provide an improved high frequency dielectric ceramic composition and a fabrication method thereof, which is capable of sintering a composition material at a lower temperature ranging from 900°~1250° C. without using a sintering aid and which has a fine structure and an excellent dielectric characteristic.

To achieve the above objects, there is provided a high frequency dielectric ceramic composition composed $TiO_2$·x (ZnO) where $0.04 \leq x \leq 1.0$.

To achieve the above objects, there is further provided a high frequency dielectric ceramic composition composed of $TiO_2$·x(ZnO) in which $TiO_2$ and ZnO are mixed at a ratio of 1:0.04~1.00 based on their mole %, and are milled by a wet method, calcined, and sintered for 2~4 hours at 900°~1250° C.

To achieve the above objects, there is also provided a high frequency dielectric ceramic composition composed of a composition of $[Zn_{1-y}(Ca,Ba,Sr)_yO]_xTiO_{3-x}$, where $0.04 \leq x \leq 1.0$, and $0 < y \leq 0.90$, and where a zinc oxide, a titanium dioxide, a calcium carbonate, a barium carbonate, and a strontium carbonate are mixed to satisfy the above-mentioned expression, are milled by a wet method, calcined, and sintered for 2~4 hours at 900°~1250° C.

DETAILED DESCRIPTION OF THE INVENTION

The composition according to the present invention is expressed as follows:

$$TiO_2 \cdot x(ZnO)$$

where $0.04 \leq x \leq 1.0$

In addition, the composition of the present invention may be composed by partially substituting Zn with more than one element selected from the group composed of Ca, Ba, and Sr, which is expressed as follows:

$$[Zn_{1-y}(Ca,Ba,Sr)_yO]_xTiO_{3-x}$$

where $0.04 \leq x \leq 1.0$, and $0 < y \leq 0.90$.

The composition of the present invention may be preferably expressed as follows:

$$[Zn_{1-y}(Ca,Ba,Sr)_yO]_xTiO_{3-x}$$

where $0.5 \leq x \leq 1.0$, and $0 < y \leq 0.90$.

The dielectric ceramic composition according to the present invention can be sintered at a temperature ranging from 900°~1250° C. The dielectric ceramic composition which is fabricated at the above-mentioned low temperature has a dielectric constant of 18~53, a quality factor of 1900~4747 (at 5~12 GHz), and a temperature coefficient of resonant frequency of −12~670 ppm/° C.

Namely, since the temperature coefficient of resonant frequency of the composition of $TiO_2$·x(ZnO) ($0.04 \leq x \leq 1.0$) ranges from about +200 to +325 ppm/° C., either $CaTiO_3$, $BaTiO_3$, or $SrTiO_3$ which are matched to TiO2·x(ZnO) in their crystal structures and which have a matrix composition, or a combination of the same to which a proper dielectric compensator is added may be adapted to have a temperature coefficient of 0 ppm/° C. which is required as a temperature characteristic.

The dielectric composition according to the present invention may include one or more than one kind among the above-described compensation dielectrics.

The fabrication method for a dielectric composition according to the present invention is directed to calcining each element composing the composition of the present invention at 900°~1250° C. Preferably, the composition is sintered at 1100°~1250° C. for 2~4 hours.

The dielectric ceramic and the fabrication method thereof according to the present invention will now be explained in more detail with reference to the following examples, however, the scope of the present invention is not limited thereto.

EXAMPLE I

Powders of zinc oxide (ZnO) and titanium dioxide ($TiO_2$) having a purity of more than 99% were accurately measured. Deionized water was added thereto, and the powder containing the deionized water therein was ground in a wet form by using a zirconia ball for 24 hours. Thereafter, the powder was well dried, and was filtered using a sieve of 100 mesh after mixing a PVA binder-water solution of 2 weight % into the powder. Thereafter, the powder was molded at a pressure of 98Mpa, thus forming a disk-shaped test sample. The thus formed test sample was fired at a heating rate of 300° C./hr for 2 hours at a temperature ranging from 1100° to 1300° C.

The dielectric characteristic of the thusly fabricated ceramic dielectric was measured in the microwave frequency region using an HP-8720C network analyzer. The dielectric constant was measured using a dielectric rod resonator method proposed by Hakki & Coleman, and was obtained by computing the value of the resonant frequency in a TE01 resonant mode. The quality factor and temperature coefficient of resonant frequency were measured in an open transmission cavity. The dielectric constant, the quality factor, and the temperature coefficient in accordance with each sintering are shown in Table I.

TABLE I

The microwave dielectric characteristics of a compostion of $TiO_2$.x(ZnO), where x = 0.04~1.00.

| x(mol) | Sintering Temp. (°C.) | Dielectric constant (εr) | Quality Factor (Q) | resonant frequency (GHz) | Temp. Temp. coeff. |
|---|---|---|---|---|---|
| 0.04 | 1100 | — | — | — | |
|  | 1200 | 59 | 920 | 6.93 | +200 |
|  | 1300 | 57 | 1740 | 7.15 | |
| 0.08 | 1100 | 79 | 1950 | 5.87 | |
|  | 1200 | 83 | 3240 | 5.83 | +310 |
|  | 1300 | 83 | 3220 | 5.79 | |
| 0.16 | 1100 | 104 | 700 | 5.18 | |
|  | 1200 | 107 | 7440 | 5.51 | +305 |
|  | 1300 | 85 | 2380 | 5.70 | |
| 0.50 | 1100 | 98 | 3700 | 5.13 | |
|  | 1200 | 102 | 1650 | 5.06 | +280 |
|  | 1300 | 96 | 3150 | 5.26 | |
| 1.00 | 1100 | 100 | 5410 | 5.17 | |
|  | 1200 | 99 | 4050 | 5.21 | +325 |
|  | 1300 | 97 | 5020 | 5.23 | |

The composition of the first example had a dielectric constant of 57~107, a quality factor of 700~5400 (at 5.1~7.2 GHz), and a temperature coefficient of a resonant frequency of +200~+325ppm/° C.

EXAMPLE II

A dielectric ceramic composition was fabricated using $ZnO:TiO_2=1:1$, namely, $ZnTiO_3$ as the basic constituent, with Zn being substituted with Ca, Ba, and Sr.

In order to substitute an ion of $Zn^{2+}$ in a stoichiometric $ZnTiO_3$ with ions of $Ca^{2+}$, $Ba^{2+}$, and $Sr^{2+}$, predetermined amounts of zinc oxide, titanium dioxide, calcium carbonate, barium carbonate, and strontium carbonate were added. The detailed amounts of the additives are shown in Table II.

The composition was calcined for 2 hours at 900° C., and was fired for 2 hours at 1100°~1200° C. The experimental conditions were the same as in Example I except for the above-mentioned conditions. The dielectric characteristics of the dielectric ceramic composition is shown in Table II.

TABLE II

The dielectric characteristics of a composition of $[Zn_{1-y}(Ca,Ba,Sr)_y O]_x TiO_{3-x}$, where x = 1, 0.005 ≤ y ≤ 0.08.

| element | x (mol 2) | Sintering Temp. (°C.) | Dielectric constant (εr) | Quality Factor (Q) | resonant frequency (GHz) | Temp. coe |
|---|---|---|---|---|---|---|
| Ca | 0.5 | 1100 | 25.6 | 2660 | 9.15 | |
|  |  | 1150 | 35.0 | 3620 | 9.05 | |
|  |  | 1200 | 29.2 | 3180 | 8.88 | +39 |
|  | 1.0 | 1100 | 25.1 | 3050 | 9.18 | |
|  |  | 1150 | 35.0 | 3480 | 9.18 | |
|  |  | 1200 | 28.6 | 2950 | 8.95 | +29 |
|  | 2.0 | 1100 | 24.6 | 3330 | 9.69 | |
|  |  | 1150 | 35.0 | 3260 | 9.46 | |
|  |  | 1200 | 28.3 | 3470 | 9.08 | +23 |
|  | 4.0 | 1100 | 23.0 | 3070 | 9.85 | |
|  |  | 1150 | 34.0 | 3620 | 9.64 | |
|  |  | 1200 | 27.9 | 3400 | 9.05 | +8.7 |
|  | 8.0 | 1100 | 24.4 | 2810 | 9.70 | |
|  |  | 1150 | 36.0 | 3060 | 9.35 | |
|  |  | 1200 | 29.7 | 3240 | 8.84 | +22 |
| Ba | 0.5 | 1100 | 24.5 | 2110 | 9.82 | |
|  |  | 1150 | 36.3 | 1900 | 9.47 | |
|  |  | 1200 | 29.4 | 2600 | 9.45 | +32 |
|  | 1.0 | 1100 | 25.5 | 2370 | 9.79 | |
|  |  | 1150 | 29.1 | 2670 | 9.61 | |
|  |  | 1200 | 29.1 | 2140 | 9.46 | +37 |
|  | 2.0 | 1100 | 24.3 | 2680 | 9.69 | |
|  |  | 1150 | 28.3 | 2470 | 9.35 | |
|  |  | 1200 | 28.5 | 2930 | 9.40 | +21 |
|  | 4.0 | 1100 | 27.7 | 2830 | 9.47 | |
|  |  | 1150 | 39.0 | 1950 | 9.50 | |
|  |  | 1200 | 28.3 | 2600 | 9.41 | +15 |
|  | 8.0 | 1100 | 24.5 | 2770 | 9.83 | |
|  |  | 1150 | 25.0 | 2600 | 9.78 | |
|  |  | 1200 | 25.4 | 2930 | 9.81 | −19 |
| Sr | 0.5 | 1100 | 23.0 | 2940 | 9.82 | |
|  |  | 1150 | 28.6 | 2660 | 9.44 | |
|  |  | 1200 | 29.1 | 2820 | 9.44 | +34 |
|  | 1.0 | 1100 | 22.9 | 2740 | 9.82 | |
|  |  | 1150 | 28.6 | 2800 | 9.40 | |
|  |  | 1200 | 28.7 | 2710 | 9.41 | +27 |
|  | 2.0 | 1100 | 18.5 | 3210 | 9.97 | |
|  |  | 1150 | 28.2 | 2870 | 9.59 | |
|  |  | 1200 | 30.5 | 2900 | 9.54 | +7.2 |
|  | 4.0 | 1100 | 22.9 | 2960 | 9.84 | |
|  |  | 1150 | 33.9 | 3000 | 9.49 | |
|  |  | 1200 | 28.4 | 2120 | 9.44 | −7.4 |
|  | 8.0 | 1100 | 24.1 | 2310 | 9.55 | |
|  |  | 1150 | 31.2 | 2400 | 9.07 | |
|  |  | 1200 | 31.6 | 2480 | 9.16 | +47 |

The dielectric ceramic composition fabricated at a low sintering temperature of 900°~1250° C. in Example II has an excellent dielectric characteristics with a dielectric constant of 18~35, a quality factor of 1900~3600 (at 5~12 GHz), and a temperature coefficient of resonant frequency of −19~47ppm/° C.

EXAMPLE III

A dielectric ceramic composition was fabricated using $ZnO:TiO_2=0.5:1$, namely, $ZnTi_2O_5$, as the basic constituent, with Zn being substituted with Ca, Ba, and Sr.

In order to substitute an ion of $Zn^{2+}$ of a stoichiometric $ZnTi_2O_5$ with ions of $Ca^{2+}$, $Ba^{2+}$, $Sr^{2+}$, predetermined amounts of zinc oxide, titanium dioxide, calcium carbonate, barium carbonate, and strontium carbonate were added. The detailed amount of the additives are shown in Table II. In addition, predetermined amounts of calcium carbonate, barium carbonate and strontium carbonate were added. The detailed amounts of these additives are shown in Table III-5. The above-described composition was calcined at 900° C. for 2 hours, and was fired at 1050°~1200° C. for 4 hours. The other experimental conditions were the same as in Example I in Table I. The dielectric characteristics of the thusly obtained dielectric ceramic composition are shown in Table III-5.

The dielectric composition fabricated at the sintering temperature of 1050°~1250° C. in Example III had a dielectric constant of 41~53, a quality factor of 3140~4740 (at 10~11 GHz), a Q*f of more than 30,000, and a temperature coefficient of a resonant frequency of −12~+670ppm/° C., which are excellent dielectric characteristics.

TABLE III

The microwave dielectric characteristic of a composition of $[Zn_{1-x}Ca_xO]_yTiO_{3-y}$, where $x = 0.5$, $0.005 \leq y \leq 0.50$.

| y (mol 2) | Sintering Temp. (°C.) | Dielectric constant (εr) | Quality Factor (Q) | resonant frequency (GHz) | Q*f₀ | Temp. coeff. |
|---|---|---|---|---|---|---|
| 0.5 | 1050 | 45.46 | 3280 | 10.6099 | 34800 | |
| | 1100 | 50.40 | 3470 | 10.5800 | 36700 | |
| | 1150 | 51.62 | 4310 | 10.5119 | 45300 | +178 |
| | 1200 | 51.61 | 4230 | 10.3279 | 43700 | |
| | 1250 | 51.71 | 4300 | 10.2659 | 44100 | |
| 1.0 | 1050 | 45.49 | 3860 | 10.5663 | 40800 | |
| | 1100 | 50.90 | 2940 | 10.5080 | 30900 | |
| | 1150 | 50.64 | 4310 | 10.5656 | 45500 | +206 |
| | 1200 | 51.56 | 4120 | 10.4751 | 43100 | |
| | 1250 | 51.68 | 4220 | 10.1750 | 42900 | |
| 2.0 | 1050 | 44.29 | 3670 | 10.5002 | 38500 | |
| | 1100 | 50.80 | 4300 | 10.4250 | 44800 | |
| | 1150 | 50.80 | 3730 | 10.3451 | 38600 | +188 |
| | 1200 | 51.34 | 3990 | 10.1837 | 40600 | |
| | 1250 | 51.21 | 4160 | 10.1250 | 24100 | |
| 4.0 | 1050 | 45.54 | 270 | 10.5616 | 2850 | |
| | 1100 | 49.90 | 2980 | 10.4770 | 31200 | |
| | 1150 | 51.62 | 4220 | 10.4054 | 44000 | +202 |
| | 1200 | 50.14 | 3710 | 10.4585 | 38800 | |
| | 1250 | 50.03 | 4660 | 10.4600 | 46700 | |
| 8.0 | 1050 | 41.09 | 260 | 10.5914 | 2750 | |
| | 1100 | 46.80 | 3390 | 10.5740 | 35800 | |
| | 1150 | 46.97 | 3800 | 10.6406 | 40400 | +148 |
| | 1200 | 46.81 | 3910 | 10.5338 | 41200 | |
| | 1250 | 46.95 | 4200 | 10.4782 | 44000 | |
| 15.0 | 1100 | 43.21 | 3150 | 10.7421 | 33900 | |
| | 1150 | 43.92 | 3540 | 10.7966 | 38200 | |
| | 1200 | 44.39 | 3350 | 10.9468 | 36700 | +128 |
| 30.0 | 1100 | 43.33 | 3020 | 10.7592 | 32500 | |
| | 1150 | 47.34 | 2710 | 10.1235 | 27400 | |
| | 1200 | 47.29 | 2090 | 10.7654 | 22500 | +122 |
| 50.0 | 1100 | 46.56 | 2950 | 10.4194 | 30700 | |
| | 1150 | 62.43 | 1910 | 9.1697 | 17500 | |
| | 1200 | 63.62 | 1620 | 10.1564 | 16500 | +205 |

TABLE IV

The microwave dielectric characteristic of a composition of $[Zn_{1-x}Ba_xO]_yTiO_{3-y}$, where $x = 0.5$, $0.005 \leq y \leq 0.50$.

| y (mol 2) | Sintering Temp. (°C.) | Dielectric constant (εr) | Quality Factor (Q) | resonant frequency (GHz) | Q*f₀ | Temp. coeff. |
|---|---|---|---|---|---|---|
| 0.5 | 1050 | 51.03 | 4150 | 10.3335 | 42900 | |
| | 1100 | 52.3 | 4020 | 10.4024 | 41800 | |
| | 1150 | 50.15 | 3940 | 10.5602 | 41600 | +177 |
| | 1200 | 51.26 | 3430 | 10.3052 | 35300 | |
| | 1250 | 52.89 | 3650 | 10.1351 | 37000 | |
| 1.0 | 1050 | 47.95 | 4240 | 10.5010 | 44500 | |
| | 1100 | 52.10 | 3970 | 10.5114 | 41700 | |
| | 1150 | 51.30 | 3830 | 10.5808 | 40500 | +227 |
| | 1200 | 51.21 | 3860 | 10.5074 | 40600 | |
| | 1250 | 52.48 | 4330 | 10.2500 | 44400 | |
| 2.0 | 1050 | 46.67 | 3760 | 10.3576 | 38900 | |
| | 1100 | 51.70 | 4150 | 10.3136 | 42800 | |
| | 1150 | 50.80 | 4070 | 10.3357 | 42100 | +215 |
| | 1200 | 51.08 | 3530 | 10.2031 | 36000 | |
| | 1250 | 48.13 | 4200 | 10.3215 | 43400 | |
| 4.0 | 1050 | 45.73 | 3520 | 10.5723 | 37200 | |
| | 1100 | 50.96 | 3630 | 10.4898 | 38100 | |
| | 1150 | 49.53 | 3890 | 10.6468 | 41400 | +178 |
| | 1200 | 49.91 | 3500 | 10.4766 | 38900 | |
| | 1250 | 49.62 | 3780 | 10.4052 | 39300 | |
| 8.0 | 1050 | 46.61 | 3140 | 10.6389 | 33400 | |
| | 1100 | 49.60 | 4100 | 10.6370 | 43600 | |
| | 1150 | 46.96 | 3790 | 10.7004 | 40600 | +138 |
| | 1200 | 47.15 | 3070 | 10.5157 | 32300 | |
| | 1250 | 47.24 | 3140 | 10.4746 | 32900 | |
| 15.0 | 1100 | 44.69 | 3750 | 10.6732 | 40000 | |
| | 1150 | 43.16 | 1570 | 10.8090 | 12800 | |
| | 1200 | 42.95 | 2580 | 10.9491 | 28300 | +111 |
| 30.0 | 1100 | 36.63 | 1290 | 11.0750 | 14300 | |
| | 1150 | 36.62 | 1160 | 11.0540 | 12800 | |
| | 1200 | 35.99 | 910 | 11.1151 | 10100 | +24 |
| 50.0 | 1100 | 28.73 | 2280 | 11.4304 | 26100 | |
| | 1150 | 36.35 | 3290 | 11.3311 | 37300 | |
| | 1200 | 32.75 | 3020 | 11.5677 | 34900 | −12 |

TABLE V

The microwave dielectric characteristic of a composition of $[Zn_{1-x}Sr_xO]_yTiO_{3-y}$, where $x = 0.5$, $0.005 \leq y \leq 0.50$.

| y (mol 2) | Sintering Temp. (°C.) | Dielectric constant (εr) | Quality Factor (Q) | resonant frequency (GHz) | Q*f₀ | Temp. coeff. |
|---|---|---|---|---|---|---|
| 0.5 | 1050 | 43.56 | 360 | 10.6538 | 3840 | |
| | 1100 | 48.49 | 3220 | 10.6499 | 34300 | |
| | 1150 | 50.27 | 4140 | 10.6358 | 44000 | +175 |
| | 1200 | 50.90 | 3610 | 10.6164 | 38300 | |
| | 1250 | 50.91 | 4510 | 10.3881 | 46900 | |
| 1.0 | 1050 | 44.94 | 150 | 10.5386 | 1580 | |
| | 1100 | 50.15 | 3270 | 10.6842 | 34900 | |
| | 1150 | 51.06 | 4220 | 10.5728 | 44600 | +180 |
| | 1200 | 51.03 | 4540 | 10.5372 | 47800 | |
| | 1250 | 46.30 | 4530 | 10.5627 | 47800 | |
| 2.0 | 1050 | 44.40 | 130 | 10.5625 | 1370 | |
| | 1100 | 48.55 | 4260 | 10.6212 | 45200 | |
| | 1150 | 50.31 | 4440 | 10.6092 | 47100 | +174 |
| | 1200 | 50.14 | 4270 | 10.6220 | 45400 | |
| | 1250 | 50.12 | 4400 | 10.3218 | 45400 | |
| 4.0 | 1050 | 39.22 | 130 | 10.6728 | 1390 | |
| | 1100 | 46.51 | 4540 | 10.6965 | 48600 | |
| | 1150 | 48.66 | 4470 | 10.6034 | 47400 | +157 |
| | 1200 | 48.61 | 4010 | 10.5925 | 42500 | |
| | 1250 | 51.61 | 4580 | 10.2950 | 47200 | |
| 8.0 | 1050 | 36.25 | 220 | 10.8571 | 2390 | |
| | 1100 | 45.64 | 4430 | 10.9327 | 48400 | |
| | 1150 | 46.55 | 4740 | 10.7939 | 51200 | +109 |
| | 1200 | 46.50 | 4470 | 10.7508 | 48100 | |
| | 1250 | 48.87 | 4240 | 10.4643 | 44400 | |
| 15.0 | 1100 | 44.00 | 480 | 11.0071 | 48000 | |
| | 1150 | 44.81 | 3020 | 10.7737 | 32500 | |
| | 1200 | 44.23 | 3700 | 10.9290 | 40400 | +60 |
| 30.0 | 1100 | 76.45 | 1050 | 10.6305 | 11200 | |
| | 1150 | 76.84 | 1070 | 9.7311 | 10400 | |
| | 1200 | 77.22 | 1090 | 9.4358 | 10300 | +386 |

TABLE V-continued

The microwave dielectric characteristic of a composition of $[Zn_{1-y}Sr_yO]_xTiO_{3-x}$, where $x = 0.5$, $0.005 \leq y \leq 0.50$.

| y (mol 2) | Sintering Temp. (°C.) | Dielectric constant ($\epsilon r$) | Quality Factor (Q) | resonant frequency (GHz) | $Q*f_0$ | Temp. coeff. |
|---|---|---|---|---|---|---|
| 50.0 | 1100 | 61.60 | 2220 | 9.4743 | 21000 | |
| | 1150 | 63.46 | 550 | 11.6715 | 6400 | |
| | 1200 | 135.79 | 590 | 11.584 | 6800 | +670 |

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A high frequency dielectric ceramic composition consisting of $TiO_2 \cdot x(ZnO)$ wherein $0.04 \leq x \leq 1.0$, and the composition has a dielectric constant of 18–53 and a quality factor of 1900–4747 at 5–12 GHz.

2. The composition according to claim 1, wherein said Zn is substituted with a member selected from the group consisting of Ca, Ba and Sr to satisfy the following formula: $_xTiO_{3-x}$ wherein $0.04 \leq x \leq 1.0$, and $0 < y \leq 0.90$.

3. The composition according to claim 2, wherein x is in the range of $0.5 \leq x \leq 1.0$.

* * * * *